L. FINE.
GAGING DEVICE.
APPLICATION FILED JULY 22, 1918.
1,369,275.
Patented Feb. 22, 1921.
2 SHEETS—SHEET 1.
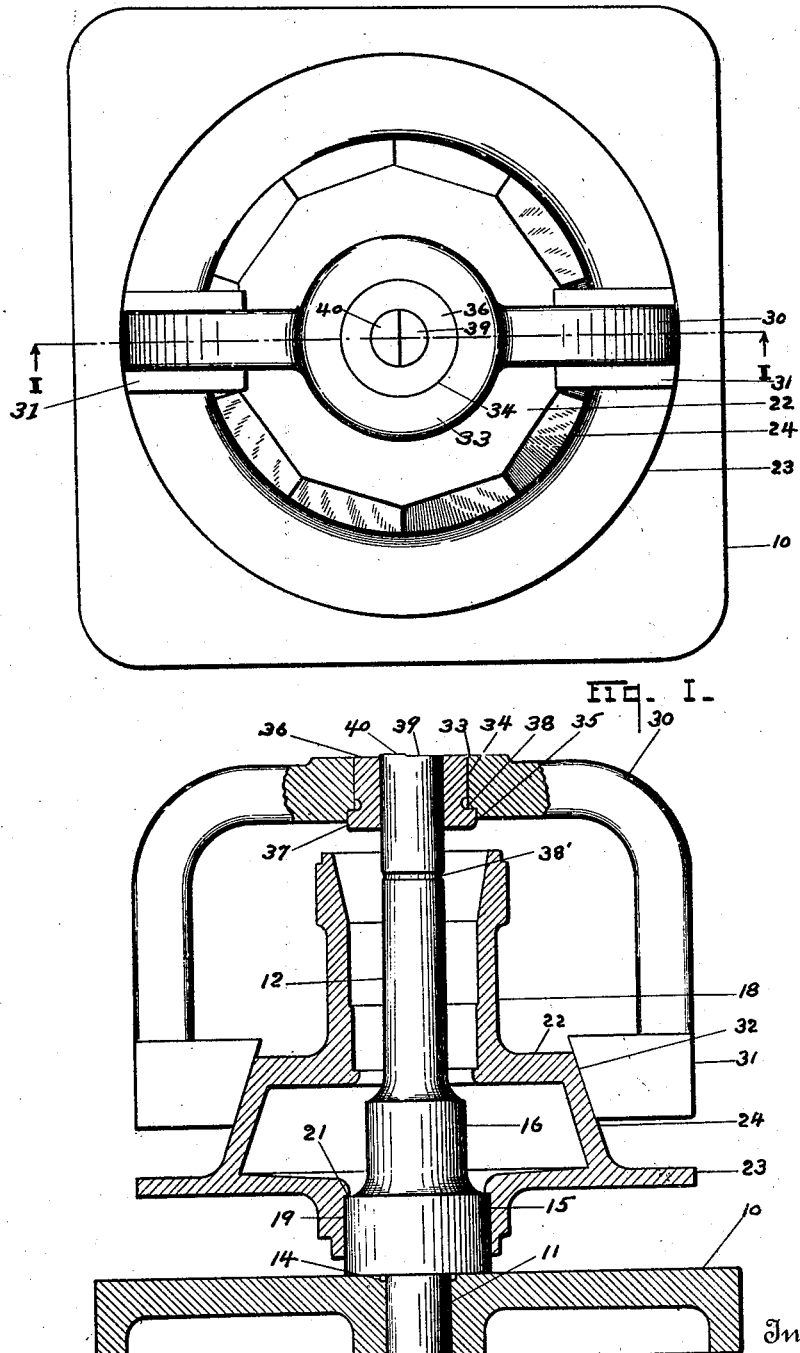
Fig. I.
Fig. II.
Inventor
Lewis Fine
By Chester H Bruselton
Attorney L. FINE.
GAGING DEVICE.
APPLICATION FILED JULY 22, 1918.
1,369,275. Patented Feb. 22, 1921.
2 SHEETS—SHEET 2.
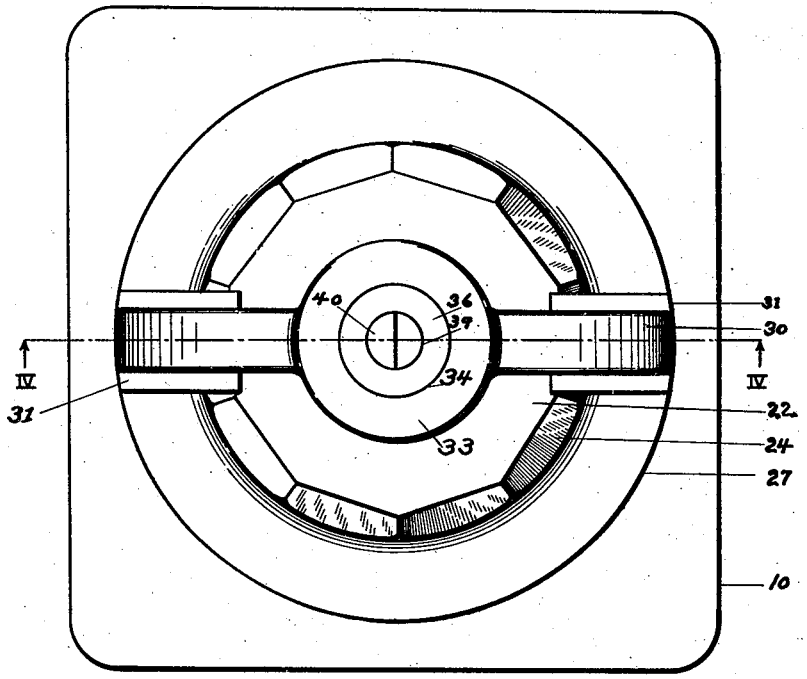
Fig. I.
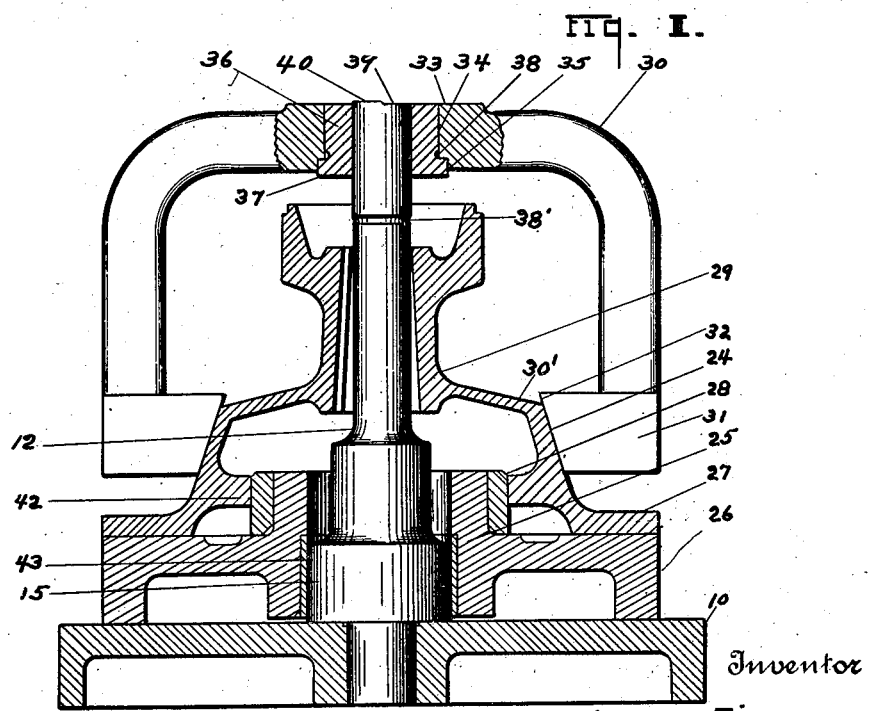
Fig. IV.
Inventor
Lewis Fine
By Chester H Braselton
Attorney

UNITED STATES PATENT OFFICE.

LEWIS FINE, OF PHILADELPHIA, PENNSYLVANIA, ASSIGNOR TO BUDD WHEEL CORPORATION, OF PHILADELPHIA, PENNSYLVANIA, A CORPORATION OF VIRGINIA.

GAGING DEVICE.

1,369,275.   Specification of Letters Patent.   Patented Feb. 22, 1921.

Application filed July 22, 1918. Serial No. 246,210.

*To all whom it may concern:*

Be it known that I, LEWIS FINE, a citizen of the United States, residing at Philadelphia, in the county of Philadelphia and State of Pennsylvania, have invented certain new and useful Improvements in Gaging Devices, of which I declare the following to be a full, clear, and exact description.

This invention relates to an improved gaging device, and has for its primary object, to provide such a device whereby previous to assembly the seating portions on the front and rear inner hubs for motor vehicle wheels can be quickly gaged within the most practicable degree of accuracy.

Further objects, and objects relating to economies of production and details of construction, will definitely appear from the detailed description to follow.

I accomplish the objects of my invention by the devices and means described in the following specification. My invention is clearly pointed out in the appended claims.

A structure constituting a preferred embodiment of my invention is illustrated in the accompanying drawings, forming a part of this specification, in which:

Figure I is a top plan view of my gaging device, showing a front inner hub in gaging position.

Fig. II is a vertical, sectional view taken substantially on the line II—II of Fig. I.

Fig. III is a view similar to Fig. I, showing a rear inner hub in gaging position.

Fig. IV is a vertical, sectional view taken substantially on the line IV—IV of Fig. III.

Referring to the drawings in detail, a suitable base 10, preferably of metal, is provided with the central opening 11 adapted for receiving one end of a spindle 12. Keys 14 hold the spindle 12 against turning movement. The spindle 12 is further provided with the enlarged cylindrical portions 15 and 16 formed integrally thereon. A front inner hub 18 (Fig. II) when in use on a vehicle revolves on the steering spindle and is adapted to receive and be telescoped by the wheel hub to which the inner ends of the spokes are secured. The steering spindle and wheel are not shown in the drawings as they form no part of my invention. The hub 18 at its inner end has an inner bearing surface 19 for accommodating the usual ball or roller bearings positioned between the hub and steering spindle and the bearing surface forming an annular shoulder 21. The enlarged portion 15 (Fig. II) on the spindle 12 is adapted to fit snugly in the bearing surface 19 and the annular shoulder 21 rests on the upper end of the enlarged portion 15 whereby the hub 18 is seated on the spindle 12. The hub 18 has an enlarged pyramidal portion 22 which, in the illustrative form of embodiment, is a decagonal pyramid having like faces 24. It is obvious, of course, that the portion 22 may have any desired number of faces or sides. The wheel hub (not shown) has a portion complemental to the portion 22 of the inner hub. The faces of portion 22 of the inner hub are machined to secure a proper seating surface.

For seating an inner rear hub 29 (Fig. IV) in position to be gaged, I provide the sleeve 25 having the circular horizontal flange 26 which projects downwardly at its outer edge whereby the sleeve 25 is seated on the base 10. An enlarged circular flange 27 on the inner end of the hub rests on the flange 26 when in position to be gaged. A centering ring 28 is mounted about the upper portion of the sleeve 25 and is adapted for engaging the inner side of a circular flange 42 within the enlarged portion 30′ of the rear inner hub and centering the same about the upper portion of the sleeve 25. The lower inner surface of the sleeve 25 is offset or enlarged and adapted to receive the bushing 43 which insures a tight fit about the enlarged portion 15 of the spindle 12. The enlarged portion 30′ of the rear inner hub 29 is similar to the pyramidal portion 22 of the front inner hub 18 and has corresponding like faces 24.

A U-shaped member 30 is provided at its terminals with inwardly projecting portions or blocks 31. These blocks have diametrically opposed faces 32, complemental to the diametrically opposite faces of the decagonally sided portions 22 and 30′ of the respective front inner hub 18 and the rear inner hub 29. A flat surface 33 is provided on the external side of the portion intermediate the terminals of the U-shaped member 30. Centrally of the flat surface 33 is provided an opening 34 having the annular offset or seat 35 near its inner end. A bushing 36 has a flange 37 and adjacent this flange, a groove 38; the bushing being adapted for a forced fit in the opening 33, the flange 37 seating on the offset 35.

The spindle 12 from its upper end to the groove 38' is ground to insure a very accurate fit in the bushing 36. The outer end of the spindle 12 has the one-half surface 39 offset and lower than the other one-half surface 40. This offset may be any desired fraction of an inch, depending upon the approximate degree of accuracy with which it is desired to gage the hubs.

In the operation of the above described device, the inner front hub 18 is first mounted for gaging (Fig. II), or if it is desired to gage the rear inner hub 29, the hub would be mounted as illustrated in Fig. IV. The U-shaped member 30 is then positioned on the upper end of the spindle 12, (Figs. II and IV) and if the faces 32 of the blocks 31 slide down diametrically opposed sides 24 of the front inner hub 18 or the rear inner hub 29 to such an extent that either the offset surface 39 or the raised surface 40 on the end of spindle 12 is approximately flush with the surrounding surface of the bushing 36, the diametrically opposed sides 24 of the hubs are properly machined for seating the outer hub. Again, the raised surface 40 may be slightly above the surrounding surface of the bushing 36 and the offset surface 39 slightly below, and yet the sides 24 machined within the proper degree. In other words, the two surfaces provide plus and minus limits within which the sides 24 of the hubs are gaged. The relation of the surfaces 39 and 40 to the adjacent surface of the bushing 36 can be found by the operator sliding a finger over the adjoining surfaces and it has been found in actual practice that a high degree of accuracy can thus be obtained.

I have herein described, and illustrated in the accompanying drawings, the use of my invention in gaging the wheel seat on a front and rear inner hub. The hub is of a certain form, and it is to be understood that my invention is not to be so limited. The invention is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a device of the class described, the combination of a base; a spindle seated on said base and adapted for centering an inner hub having a driving surface; a wheel seat gaging means, comprising a horizontal member provided with a central opening adapted for sliding engagement on the upper end of said spindle and arms extending downwardly from said horizontal member and having diametrically opposed faces on the terminals thereof which correspond in relation to each other and distance apart to the diametrically opposed portions of the driving surface of the wheel hub; and co-acting indicating means on the spindle and horizontal member whereby the seating surface on the inner hub can be gaged.

2. In a device of the class described, the combination of a base; a spindle seated on said base and adapted for centering and seating an inner hub having a driving surface; a wheel seat gaging means, comprising a horizontal member provided with a central opening adapted for sliding engagement on the upper end of said spindle; arms extending downwardly from said horizontal member and inwardly projecting lugs or blocks on the terminals thereof, having diametrically opposed faces corresponding in relation to each other and distance apart to the diametrically opposed portions of the driving surface of the hub; and co-acting indicating means on the said spindle and horizontal member whereby the seating surface on the inner hub can be gaged.

3. In a device of the class described, the combination of a base; a spindle seated on said base and adapted for centering and seating an inner hub having a pyramidal portion for a driving surface; a wheel seat gaging means, comprising a horizontal member provided with a central opening adapted for sliding engagement on the upper end of said spindle; spaced arms extending downwardly from said member and inwardly projecting lugs or blocks on the terminals thereof having diametrically opposed faces corresponding in relation to each other and distance apart to diametrically opposed sides or faces of said driving surface; and co-acting indicating means on said spindle and horizontal member whereby the seating surface on the inner hub can be gaged.

4. In a device of the class described, the combination of a base; a spindle seated on said base and adapted for centering and seating an inner hub having a driving surface; a wheel seat gaging means, comprising a horizontal member provided with a central opening adapted for sliding engagement on the upper end of said spindle, arms extending downwardly from said horizontal member, and inwardly projecting lugs or blocks on the terminals thereof, having diametrically opposed faces corresponding in relation to each other and distance apart to the diametrically opposed portions of the driving surface of the hub.

5. In a device of the class described, a base; a spindle mounted on said base and having an enlarged portion upon which a seat of an inner front hub is adapted to rest; a supplemental base mounted on said first base and centered by a said spindle and adapted to seat and center a rear inner hub; a gaging member, comprising a horizontal member provided with a central opening adapted for sliding engagement on the upper end of said spindle, arms extending downwardly from said horizontal member and having diametrically opposed faces on the terminals thereof which correspond in relation to each other and distance apart to the diametrically opposed portions of the driving surface of the wheel; and co-acting indicating means on the spindle and horizontal member whereby the seating surface on the inner hub can be gaged.

6. In a device of the class described, a base; a spindle mounted on said base and having an enlarged portion upon which a seat of an inner front hub is adapted to rest; a supplemental base mounted on said first base, and centered by said spindle and adapted to seat and center an inner rear hub, said hubs having a pyramidal portion for a driving surface; a wheel seat gaging means, comprising a horizontal member provided with a central opening adapted for sliding engagement on the upper end of said spindle, spaced arms extending downwardly from said member, inwardly projecting lugs or blocks on the terminals thereof having diametrically opposed faces corresponding in relation to each other and distance apart to diametrically opposed sides or faces of said driving surface; and co-acting indicating means on said spindle and horizontal member whereby the seating surface on said hub can be gaged.

7. A device for gaging the faces of pyramidal bodies, comprising the combination of a base, a spindle mounted on said base, means for centering and seating a pyramidal body around said spindle, a yoke slidably mounted on the upper end of said spindle and a pair of blocks carried by said yoke diametrically opposite each other, said blocks having faces opposed to each other and inclined to the horizontal plane at an angle complementary to the angle which the sides of said pyramidal body make with its base.

8. A device for gaging the sides of pyramidal bodies comprising the combination of a base, a spindle mounted thereon, means for seating and centering a pyramidal body around said spindle, a member slidably mounted on the upper end of said spindle and carrying a pair of blocks diametrically opposite each other and provided with faces opposed to each other and inclined to a plane perpendicular to the axis of the spindle at angles equal to the angles between the sides of said pyramidal body and its base, said parts being so mounted and proportioned that, when a pyramidal body having sides of the correct dimensions is mounted in place, the upper surface of said gaging member will be flush with the upper end of said spindle.

9. A device for gaging pyramidal bodies comprising the combination of a base, a spindle mounted thereon, means for centering a pyramidal body around said spindle, a gaging member slidably mounted on the upper end of said spindle, a pair of blocks carried by said member, and diametrically opposite each other, having faces inclined to a plane perpendicular to the axis of the spindle at the same angle as the sides of said pyramidal body and opposed to each other, the distance between said faces, measured in a plane perpendicular to the axis of the spindle and cutting said blocks and said pyramidal body, being equal to the distance between the corresponding sides of the pyramidal body, measured in said plane, and the vertical distances between said plane and the upper end of the spindle and between said plane and the upper surface of said member being equal.

10. A device for gaging pyramidal bodies comprising the combination of a base, a spindle mounted thereon, means for centering a pyramidal body around said spindle, a gaging member slidably mounted on the upper end of said spindle, a block carried by said member and inclined at an angle to a plane, cutting said block and pyramidal body and perpendicular to the axis of said spindle, equal to the angle made by the sides of said body with said plane, the distance, measured in said plane, from said face to the axis of the spindle being equal to the distance, in said plane, from a side face of said body to said axis, and the vertical distances of said plane from the upper surface of said member and the upper end of said spindle being equal.

In testimony whereof, I affix my signature.

LEWIS FINE.